United States Patent
Stamm et al.

(10) Patent No.: US 7,156,335 B2
(45) Date of Patent: Jan. 2, 2007

(54) MAM ASSEMBLY PROCESS AND FEATURES

(75) Inventors: Stephen J. Stamm, Fort Lupton, CO (US); James J. Kuhar, Broomfield, CO (US)

(73) Assignee: Quantum Corporation, San Jose, CA (US)

(*) Notice: Subject to any disclaimer, the term of this patent is extended or adjusted under 35 U.S.C. 154(b) by 66 days.

(21) Appl. No.: 10/976,583

(22) Filed: Oct. 28, 2004

(65) Prior Publication Data

US 2006/0163407 A1 Jul. 27, 2006

(51) Int. Cl.
*G11B 23/107* (2006.01)

(52) U.S. Cl. .................................................. 242/348

(58) Field of Classification Search ................ 242/344, 242/348, 348.2, 912; 360/132, 133
See application file for complete search history.

(56) References Cited

U.S. PATENT DOCUMENTS

| | | | |
|---|---|---|---|
| 4,338,644 A | 7/1982 | Staar | |
| 4,960,982 A | 10/1990 | Takahira | |
| 5,119,353 A | 6/1992 | Asakura | |
| 5,606,467 A | 2/1997 | Hirata | |
| 6,304,416 B1* | 10/2001 | McAllister et al. | 360/132 |
| 6,452,745 B1* | 9/2002 | Shiga et al. | 360/132 |
| 6,702,215 B1* | 3/2004 | Stamm et al. | 242/348 |
| 2003/0001040 A1* | 1/2003 | Morita | 242/348.2 |
| 2003/0002214 A1* | 1/2003 | Kitamura et al. | 360/132 |
| 2003/0183715 A1* | 10/2003 | Hiraguchi | 242/348 |
| 2004/0037004 A1* | 2/2004 | Kitahara | 360/133 |
| 2004/0107433 A1* | 6/2004 | Izumida | 360/132 |

* cited by examiner

*Primary Examiner*—William A. Rivera
(74) *Attorney, Agent, or Firm*—Morrison & Foerster LLP

(57) ABSTRACT

A tape cartridge housing allowing for both pre-shell closure and post-shell closure insertion of an auxiliary memory unit is provided. A flexible tape cartridge housing allows a manufacturer of tape cartridges to select whether to incorporate an auxiliary memory unit into the tape cartridge during the manufacturing process while a tape cartridge is still not fully assembled, during the end of the manufacturing process when the tape cartridge top and bottom shells have been combined, or after the manufacturing process when the tape cartridge is ready for operation.

12 Claims, 3 Drawing Sheets

MAM ASSEMBLY PROCESS AND FEATURES

BACKGROUND OF THE INVENTION

1. Field of the Invention

The present invention relates generally to tape cartridges, and more particularly to a tape cartridge housing that may hold an auxiliary memory unit.

2. Description of the Related Art

Digital data is stored on tape cartridges that include a magnetic tape media wound between a pair of tape reels as data is transferred to or from the media. In the art of data storage, the physical space required to store data on tape cartridges is an important concern. To conserve space, tape-handling devices, e.g. tape drives, often use a single reel tape cartridge design, which utilizes a supply reel located within a removable tape cartridge and a take-up reel located within the tape-handling device.

In addition to the tape media, tape cartridges often include an auxiliary memory unit, e.g. an integrated circuit chip, for storing information related to the cartridge and/or its contents that is more readily accessible by the tape-handling device. The communication between the tape-handling device and the auxiliary memory unit is primarily provided by one of two methods.

According to a first method, the auxiliary memory unit is mounted to the cartridge in a manner that provides contact between one or more electrical conductors connected to the auxiliary memory unit and mating conductors within the tape-handling device. This is commonly referred to in the art as a "contact" memory element design. In this case, when a cartridge including the auxiliary memory unit is inserted into the tape-handling device, a read/write device makes contact with the auxiliary memory unit conductors. The read/write device via the conductors is then able to provide power to the auxiliary memory unit and read and/or write data to the auxiliary memory unit.

According to a second method, a non-contact interface, such as a Radio Frequency (RF) link, between the auxiliary memory unit and an RF device, e.g., RF transceiver, in the tape-handling device is utilized. In this case, the auxiliary memory unit may be read from and written to by the RF transceiver, which additionally provides power to the auxiliary memory unit eliminating the need for physical contact between the auxiliary memory unit and the transceiver. This is commonly referred to in the art as a "contactless" chip design.

Some tape manufacturers use cartridge housings specified or manufactured by another company. Typically, a manufacturer selects and uses one of two different housing types when constructing a tape cartridge having an auxiliary memory unit. A first type of housing and process incorporates the auxiliary memory unit on the assembly line before the cartridge is closed. In such a tape cartridge, an auxiliary memory unit must be inserted into the cartridge before the tape cartridge shell is closed. If an auxiliary memory unit needs to be incorporated into such tape cartridge after the cartridge has been assembled, the cartridge is partially disassembled, and then the auxiliary memory unit is inserted.

A second type of housing and process provides a tape cartridge that allow for insertion of an auxiliary memory unit only after the tape cartridge shell is closed. In such tape cartridges, the cartridge housing includes an opening for insertion of the auxiliary memory unit. These tape cartridges each have a single auxiliary memory unit entry point. If a tape cartridge including an auxiliary memory unit is required, the shell must first be closed, and then the auxiliary memory unit may be inserted. Such cartridges may be manufactured and stockpiled without an auxiliary memory unit. An auxiliary memory unit may be inserted before shipping by the manufacturer or may be inserted by the customer at the customer's remote location, in either case, without disassembling the shell.

Due to the complexities and differences among tape manufacturers' assembly lines, a manufacturer may favor incorporating auxiliary memory units during one period of the manufacturing process over another. As such, a provider of cartridge shells may need to offer two types of shells: a first type allowing for pre-closure auxiliary memory unit insertion, and a second type allowing for post-closure auxiliary memory unit insertion. Alternatively, a manufacturer may need to drastically modify its assembly process to accommodate an available but less desirable shell type.

For example, a Linear Tape-Open (LTO) cartridge may include an auxiliary memory unit that has a small rectangular shaped antenna soldered to a chip and potted in a protective nonconductive material. The auxiliary memory unit may be placed in the cartridge at a 45-degree angle so that the antenna may be accessed by a drive from either of two sides. The auxiliary memory unit is inserted into the cartridge when all other internal components have been fixed in either the bottom or top parts of the shell but the shell has not been closed. The auxiliary memory unit is held in place when the top and bottom parts of the shell are screwed or fastened together. In an automated assembly line, suppliers of LTO tape cartridges are forced to add pick-and-place robotic equipment to insert the chip in the cartridge. Thus, adding any new feature to these existing LTO assembly lines is costly due to the required new equipment, space, assembly line down time and new manufacturing quality control and testing requirements.

BRIEF SUMMARY OF THE INVENTION

The present invention relates to an apparatus and a method that allow for incorporation an auxiliary memory unit into a tape cartridge housing during one of multiple stages of the tape cartridge assembly process. A tape cartridge housing in accordance with the present invention allows for both pre-shell closure and post-shell closure insertion of an auxiliary memory unit.

Some embodiments provide a tape cartridge housing comprising: a first shell member; a second shell member; and a auxiliary memory unit receptacle, wherein the auxiliary memory unit receptacle is adapted to accept an auxiliary memory unit when the first shell member is unassembled from the second shell member; wherein the first shell member and the second shell member assemble to form the tape cartridge housing and define an access slot adapted to allow pass-through of the auxiliary memory unit; and wherein the auxiliary memory unit receptacle cooperates with the access slot to accept the auxiliary memory unit after the first and second shell members are assembled.

Some embodiments provide a method of manufacturing a tape cartridge housing comprising: providing a first shell member having a retention mechanism adapted to independently hold an auxiliary memory unit; providing a second shell member, wherein the first and second shell members define an access opening adapted for insertion of the auxiliary memory unit; attaching the first shell member and the second shell member to form the tape cartridge housing; and inserting the auxiliary memory unit through the access opening.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION OF THE INVENTION

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Due to the complexity and differences among vendors' assembly lines, it may be advantageous to provide one tape cartridge housing tailored to multiple methods of incorporating an auxiliary memory unit into the tape cartridge housing. A tape cartridge housing may provide flexibility in production to better fit the needs of vendors. In accordance with the present invention, a tape cartridge housing may facilitate alternative simple, cost effective methods to manufacture an auxiliary memory unit into a tape cartridge housing.

For example, a first vendor may find it economical to incorporate an auxiliary memory unit while the tape cartridge housing is open. A second vendor may find it more convenient to use a tape cartridge housing of the same design to incorporate an auxiliary memory unit after the tape cartridge housing is closed.

Thus, a supplier of shell halves that form a tape cartridge housing having a standard design may supply the same designed housing to multiple vendors. A standard design tape cartridge housing permits a tape cartridge housing to be universally used by vendors having differing manufacturing requirements and processes. In other words, a tape cartridge housing having multiple auxiliary memory unit entry points may give a tape cartridge manufacturer the freedom and flexibility to determine where in the manufacturing and assembly process to insert an auxiliary memory unit.

Some embodiments of the present invention provide an apparatus and a method that selectively allow for incorporation an auxiliary memory unit into a tape cartridge either before or after the tape cartridge housing has been assembled. For example, a tape cartridge housing supplier may manufacture tape cartridge housings having a standard design. The housing supplier may provide the versatile tape cartridge housing to multiple tape cartridge manufactures.

Alternatively, a common tape cartridge housing design may be shared among multiple tape cartridge manufactures. A common or standard-design tape cartridge housing providing various auxiliary memory unit insertion points allows the tape cartridge manufacturer to have more flexibility in the assembly process and also shares the cost to design and develop the common but versatile housing.

Figure 1A:
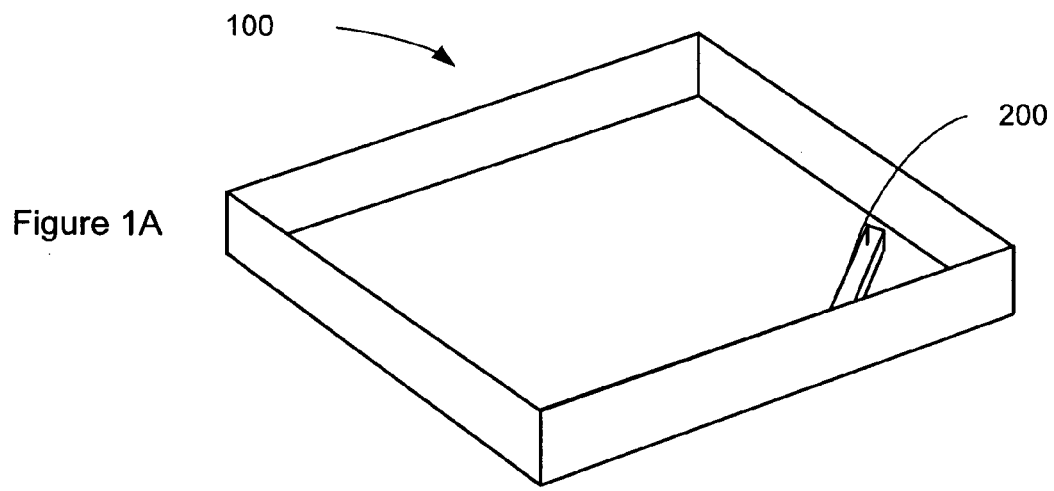
FIG. 1A shows a simplified perspective view of an open half of a tape cartridge housing having a holder for an auxiliary memory unit, in accordance with the present invention.

FIG. 1A shows a simplified perspective view of an open half of a tape cartridge housing having a holder for an auxiliary memory unit, in accordance with the present invention. A first shell member 100 includes an auxiliary memory unit receptacle 200. The auxiliary memory unit receptacle may be used to independently hold an auxiliary memory unit. If a manufacturer selects to incorporate an auxiliary memory unit into the tape cartridge housing while the first shell member 100 is open, a manufacturer may attach the auxiliary memory unit to the auxiliary memory unit receptacle 200. The auxiliary memory unit receptacle 200 will hold the auxiliary memory unit in place for the remainder of the manufacturing process.

Figure 1B:
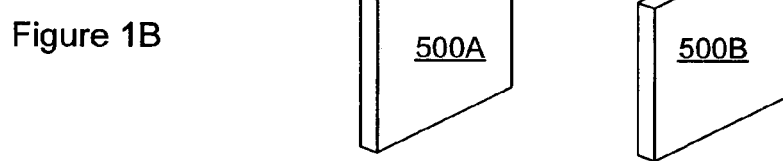
FIG. 1B shows a perspective view of various auxiliary memory units.

FIG. 1B shows a perspective view of various auxiliary memory units. Auxiliary memory units may take different forms. Auxiliary memory unit 500A is a memory unit such that may be retained in auxiliary memory unit receptacle 200 of FIG. 1A. Auxiliary memory unit 500B is an 'L' shaped memory unit such that may be retained in auxiliary memory unit receptacles 200 of FIGS. 2A–3B (described below).

Figure 1C:
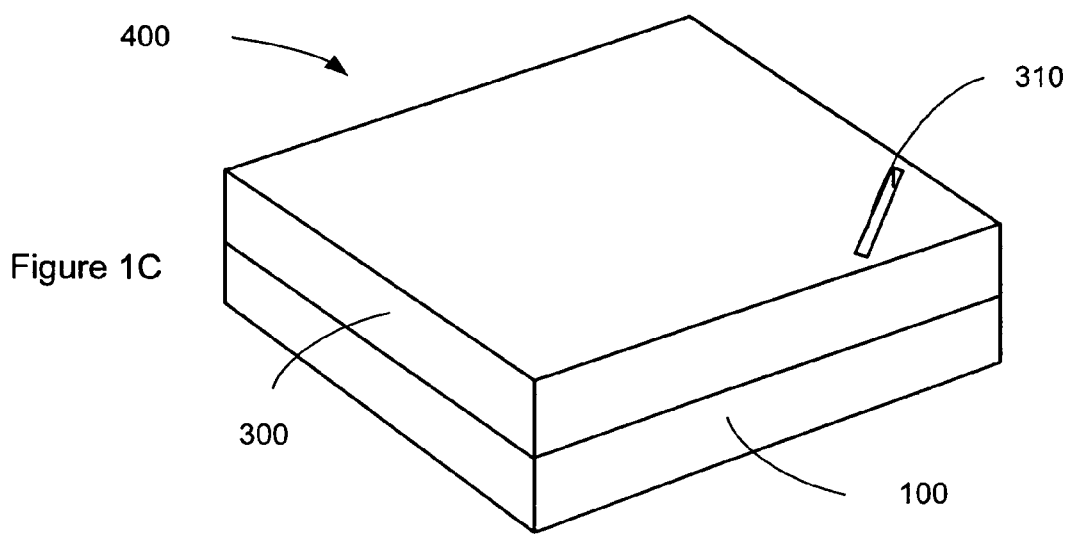
FIG. 1C shows a simplified perspective view of a closed tape cartridge housing having an access slot for an auxiliary memory unit, in accordance with the present invention.

FIG. 1C shows a simplified perspective view of a closed tape cartridge housing 400 having an access slot 310 for an auxiliary memory unit 500A, in accordance with the present invention. The tape cartridge housing 400 is formed with a first shell member 100 attached to a second shell member 300. The tape cartridge housing 400 includes an access slot 310, which provides access to the auxiliary memory unit receptacle 200. The access slot 310 is designed to allow pass-through of an auxiliary memory unit 500A. The access slot 310 may include a covering, such as a door assembly, to reduce the possibility of foreign particles from entering a closed tape cartridge housing 400.

Additionally, the access slot 310 may be formed in various positions in the tape cartridge housing 400. In the embodiment shown, the access slot 310 is defined in the second shell member 300. Alternatively, the access slot 310 may be defined in the first shell member 100, or alternatively may be defined by the combination of the first and second shell members. Also in the embodiment shown, an access slot 310 is positioned in a corner and oriented such that an auxiliary memory element 500A may be inserted in an orientation parallel to the major bottom surface of the tape cartridge housing 400. Alternatively, the access slot 310 may be positioned in the major top surface, along a side of a major face or in one of the minor side faces. Additionally, the access slot 310 may be oriented such that an auxiliary memory element 500A is inserted parallel, perpendicular, or at a non-90-degree angle of a face.

Figure 2A:
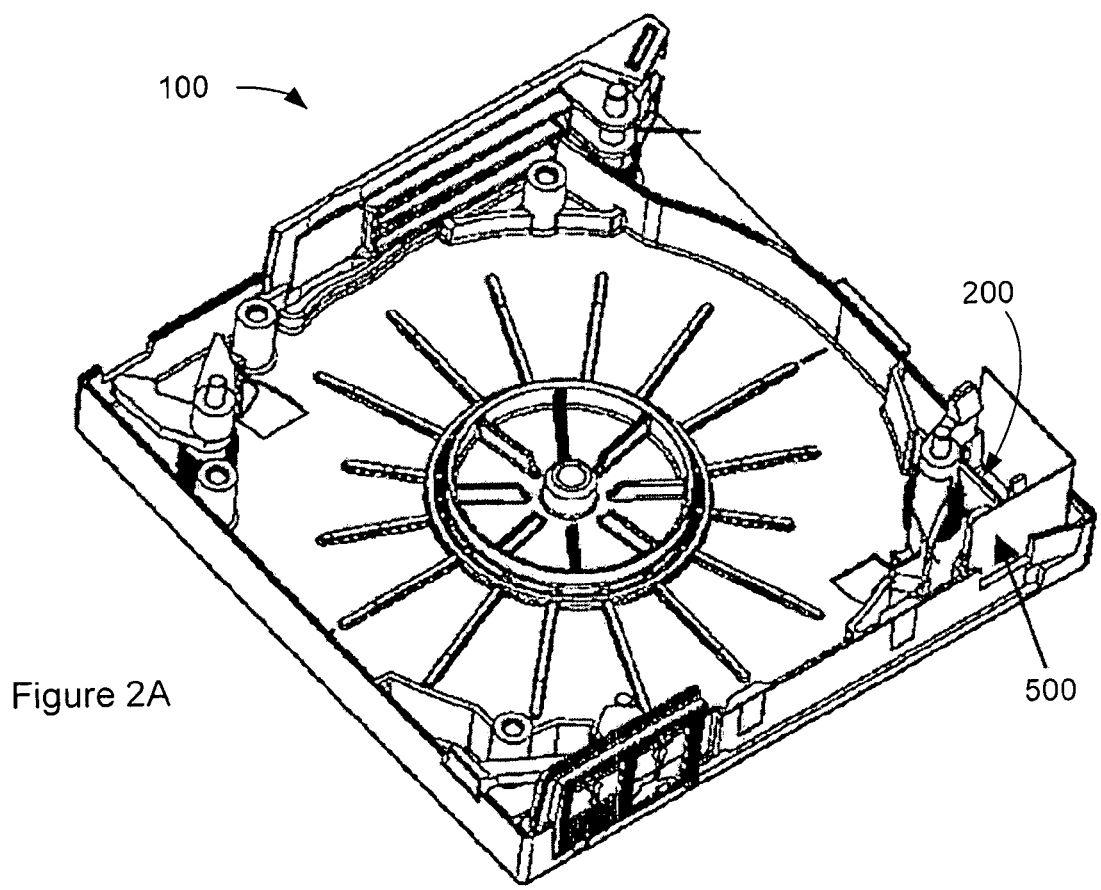
FIG. 2A shows a perspective view of an open first shell member of a tape cartridge housing holding an auxiliary memory unit, in accordance with the present invention.

FIG. 2A shows a perspective view of an open first shell member 100 of a tape cartridge housing 400 holding an auxiliary memory unit 500, in accordance with the present invention. A first shell member 100 has formed in the interior an auxiliary memory unit receptacle 200. The auxiliary memory unit receptacle 200 is shown holding an auxiliary memory unit 500 in position without the aid of a second shell member 300.

Figure 2B:
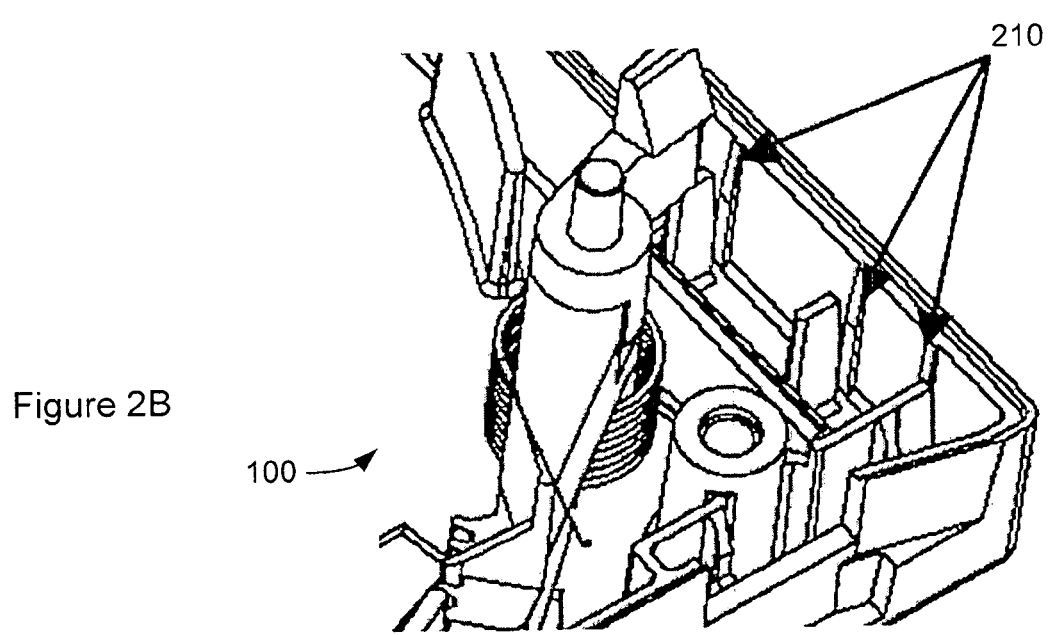
FIG. 2B shows a partial view of an open first shell member of a tape cartridge housing having an auxiliary memory unit receptacle for an auxiliary memory unit, in accordance with the present invention.

FIG. 2B shows a partial view of an open first shell member 100 of a tape cartridge housing 400 having an auxiliary memory unit receptacle 200 for an auxiliary memory unit 500 (not shown), in accordance with the present invention. The auxiliary memory unit receptacle 200 may include a plurality of chamfers 210. The plurality of chamfers 210 function to guide an auxiliary memory unit 500 during insertion. The plurality of chamfers 210 may be integrally incorporated with either or both of the first shell member 100 and/or the second shell member 300. In the example shown, the plurality of chamfers 210 are integrally incorporated with the first shell member 100. The plurality of chamfers 210 may be integrally incorporated with a shell member 100 or 300 by molding a single piece of plastic forming a shell with chamfers.

Figure 3A:
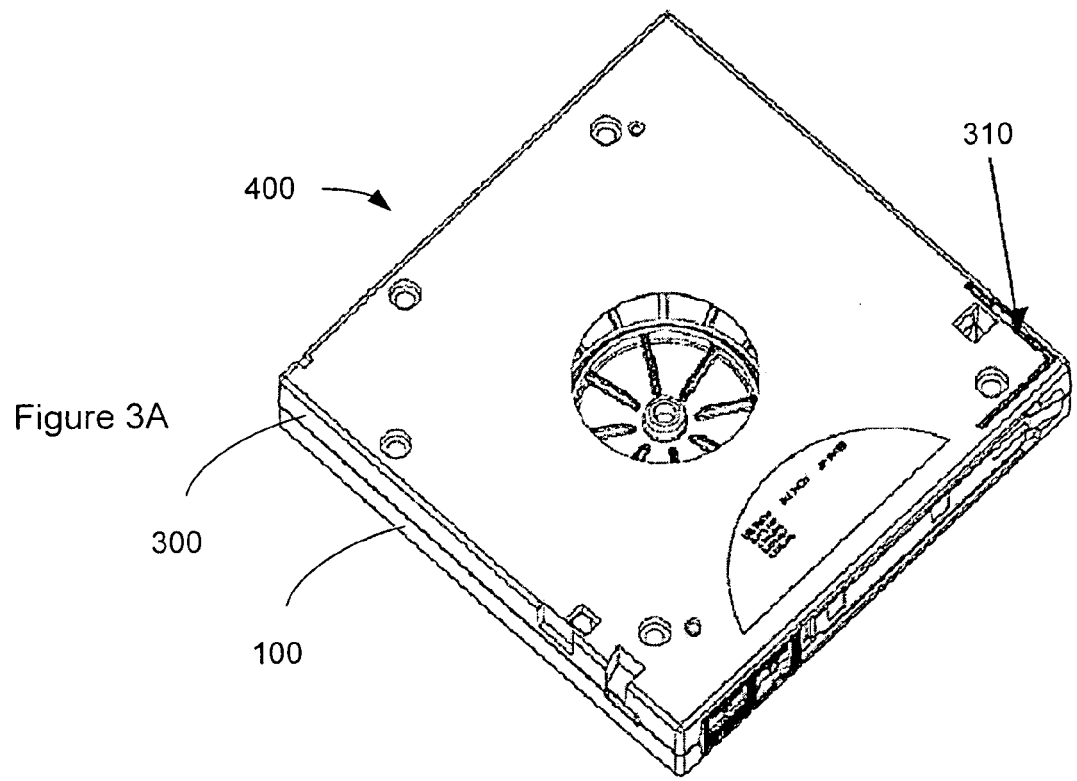
FIG. 3A shows a perspective view of an assembled tape cartridge housing having an access slot, in accordance with the present invention.

FIG. 3A shows a perspective view of an assembled tape cartridge housing 400 having an access slot 310, in accordance with the present invention. The assembled tape cartridge housing 400 includes a first shell member 100 and a second shell member 300 attached to one another. The access slot 310 allows insertion of an auxiliary memory unit 500 into the assembled tape cartridge housing 400. The example housing 400 shows the access slot 310 defined by the second shell member 300.

Figure 3B:
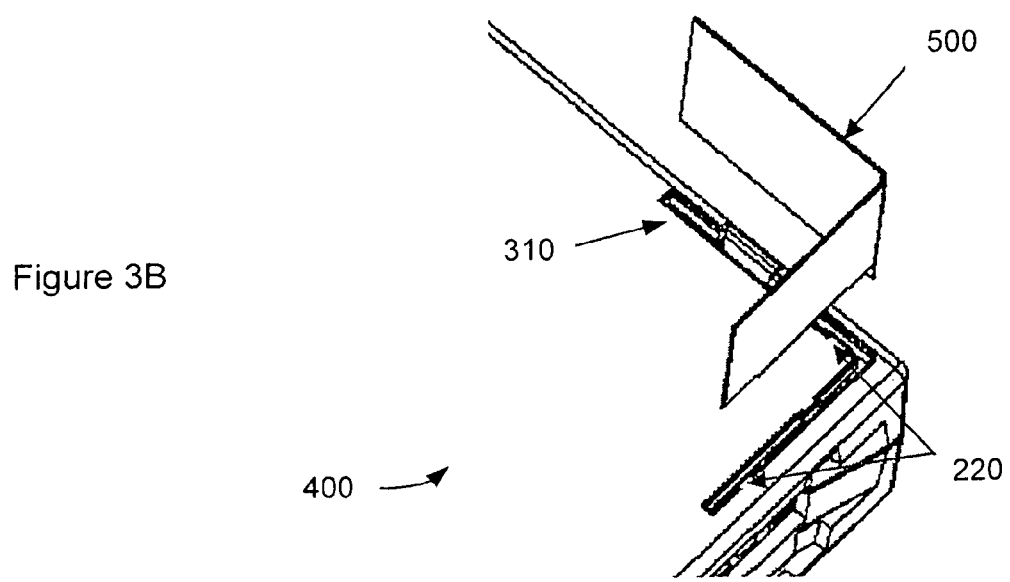
FIG. 3B shows a partial view of an assembled tape cartridge housing having an access slot and an auxiliary memory unit, in accordance with the present invention.

FIG. 3B shows a partial view of an assembled tape cartridge housing 400 having an access slot 310 and an auxiliary memory unit 500, in accordance with the present invention. The auxiliary memory unit receptacle 200 may include a plurality of keys 220 protruding in the access slot 310. The keys 220 may act as both a guide and a locking mechanism. The keys 220 may guide an auxiliary memory unit 500 and thus directing it into its seated position. The keys 220 may also lock the auxiliary memory unit 500 into place.

In some embodiments, an auxiliary memory unit 500 may be inserted into the auxiliary memory unit receptacle 200 either before or after the shell members 100 and 300 are closed but may not be removed without disassembling the housing 400. In other embodiments, an auxiliary memory unit 500 may be detachably inserted before or after shell closure but may be removed without disassembling the tape cartridge housing 400.

In accordance with the present invention, a manufacturer of parts of a tape cartridge housing 400, such as a first shell member 100, an auxiliary memory unit receptacle 200, and a second shell member 300, may provide a single kit to multiple tape manufacturers. A bottom portion may be formed by a combination of the first shell member 100 and the auxiliary memory unit receptacle 200 having chamfers 210. A top portion may be formed by the second shell member 300 defining an access slot 310 and holding a plurality of keys 220.

A first tape manufacturer use the kit in its manufacturing process. It may decide to introduce auxiliary memory units 500 before the housing 400 is assembled. For example, the manufacturer may have spare manufacturing floor space near the head of its assembly line and thus find it advantageous to insert an auxiliary memory unit 500 into the top portion before the top and bottom halves are connected to form a tape cartridge housing 400.

A second tape manufacturer may using the same kit and find it more advantageous to introduce the auxiliary memory unit 500 after the top and bottom portions have been assembled together. This manufacturer may have spare manufacturing floor space near the end of its assembly line and thus find it advantageous to insert an auxiliary memory unit 500 into a tape cartridge housing 400 after the top and bottom shells have been connected together.

In addition to allowing a manufacturer to optionally insert a member element into an unassembled tape cartridge housing, some embodiments provide a single access slot where the manufacturer or customer may insert an auxiliary memory unit 500 after the tape cartridge housing 400 has been assembled. In other embodiments, an assembled tape cartridge housing 400 provides multiple access slots 310 where the manufacturer or customer may insert the auxiliary memory unit 500 after the tape cartridge housing 400 has been assembled. For example, a first access slot 310 may be formed in the first shell member 100 underneath an auxiliary memory unit receptacle 200. A second access slot 310 may be formed in the second shell member 300 above the auxiliary memory unit receptacle 200.

In some embodiments, an unassembled tape cartridge housing 400 provides a plurality of receptacles 200 for multiple auxiliary memory units 500. In these embodiments, an assembled tape cartridge housing 400 provides an access slot 310 to one or more of the auxiliary memory unit receptacles 200. In some of these embodiments, the assembled tape cartridge housing 400 provides an access slot 310 to each of the auxiliary memory unit receptacles 200.

In some embodiments, an assembled tape cartridge housing 400 provides multiple access slots 310 to a single auxiliary memory unit receptacle 200. For example, an auxiliary memory unit receptacle 200 in either a top or bottom portion of a tape cartridge housing 400 may be accessible from a first slot 310 in the top of the tape cartridge housing 400 and additionally may be accessible from a second slot 310 in the bottom of the tape cartridge housing 400. A first tape cartridge manufacturer may insert an auxiliary memory unit 500 via an access slot 310 in the top of the housing 400, while a second tape cartridge manufacturer may insert an auxiliary memory unit 500 via an access slot 310 in the bottom of the housing 400. Yet a third manufacturer may insert an auxiliary memory unit 500 into the tape cartridge before the housing 400 is closed.

In accordance with the present invention, a tape cartridge housing 400 may be formed with a top member and a bottom member, thereby forming a shell. The top shell member may be connected to the bottom shell member during tape cartridge manufacturing. The top and/or bottom member includes a receptacle 200 for an auxiliary memory unit 500. For example, the bottom member may contain a receptacle 200 for an auxiliary memory unit 500, which may be populated while the bottom is open. The top member may define an access slot 310, such as a window, door or other access port, in which an auxiliary memory unit 500 may pass, thus allowing access to the receptacle 200 in the bottom member after the top and bottom have been assembled together. Alternatively, a receptacle 200 and an access slot 310 may be formed with a common member. Additionally, the access slot 310 may be formed at the boundary of the top and bottom members such that neither the top nor the bottom members alone defined the access slot 310.

A member having an auxiliary memory unit receptacle 200 may or may not have a locking mechanism, such as a plurality of keys 220. In embodiments where the receptacle 200 does not lock the auxiliary memory unit 500 to the member, the second member may provide a locking mechanism for holding the auxiliary memory unit 500 in placed in the receptacle 200 of the first member.

Furthermore, an auxiliary memory unit 500 may be manufactured with substrates having differing stiffness. A first type of an auxiliary memory unit 500 may include an antenna soldered to a chip and positioned on a stiff substrate. A second type of an auxiliary memory unit 500 may include an antenna soldered to a chip and positioned on a flexible substrate.

In accordance with the present invention, an auxiliary memory unit 500 having a stiff substrate may be used when a manufacturer desires to insert an auxiliary memory unit 500 before the tape cartridge housing 400 has been closed. Similarly, an auxiliary memory unit 500 having a flexible substrate may be used when a manufacturer desires to insert an auxiliary memory unit 500 after the tape cartridge housing 400 has been closed.

An auxiliary memory unit 500 having either a stiffer or more flexible substrate may be more adaptable to a particular process in an automated assembly line. For example, multiple chamfers 210 guide an auxiliary memory unit 500 during insertion. If the auxiliary memory unit 500 has a substrate made of a stiffer material, the auxiliary memory unit 500 may be easily assembled into the tape cartridge top shell during the sub-assembly process. In other words, a rigid auxiliary memory unit 500 in combination with the chamfers 210 or other guide features facilies simple automated assembly during the sub-assembly process. The stiffness may also help the auxiliary memory unit 500 to stand straight on end thus helping to guide it into the bottom shell during assembly of the tape cartridge.

For those suppliers who find less desirable to insert an auxiliary memory unit 500 into the top shell of the tape cartridge during the sub-assembly process, an access slot may also be provided in the bottom shell of the tape cartridge housing 400 that permits insertion of the auxiliary memory unit 400. According to this assembly configuration the auxiliary memory unit 500 may be manufactured with a substrate material that is much more flexible than the previously described auxiliary memory unit 500. In other words, added flexibility may be advantageously used to permit the auxiliary memory unit to be bent around protruding keys 220 in the access slot 310 formed in the tape cartridge bottom. The keys 220 may act as both a guide and a locking mechanism. The keys 220 may guide the auxiliary memory unit 500 and thus directing it into its final position. The keys 220 may also lock the auxiliary memory unit 500 into place.

The number of Linear Tape-Open (LTO), Digital Linear Tape (DLT) and Super DLT (SDLT) cartridge suppliers increases every year. Each supplier has a unique and intricate method for assembling the tape cartridges. Therefore, the more flexibility that can be built into the tape cartridge design, the more adaptable the design will be for each manufacturer. Allowing alternative methods of manufacture and assembly may speed up suppliers' development times and reduce costs.

While the invention has been described in terms of particular embodiments and illustrative figures, those of ordinary skill in the art will recognize that the invention is not limited to the embodiments or figures described.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A tape cartridge housing comprising:
   a first shell member;
   a second shell member; and
   an auxiliary memory unit receptacle, wherein the auxiliary memory unit receptacle is adapted to accept an auxiliary memory unit when the first shell member is unassembled from the second shell member;
   wherein the auxiliary memory unit receptacle includes a plurality of chamfers for guiding the auxiliary memory unit during insertion into the auxiliary memory unit receptacle when the first shell member is unassembled from the second shell member;
   wherein the first shell member and the second shell member assemble to form the tape cartridge housing and define an access slot adapted to allow pass-through of the auxiliary memory unit to the auxiliary memory unit receptacle; and
   wherein the auxiliary memory unit receptacle cooperates with the access slot to accept the auxiliary memory unit after the first and second shell members are assembled.

2. The tape cartridge housing of claim 1, wherein the auxiliary memory unit is removable from the tape cartridge housing after the first and second shell members are assembled.

3. The tape cartridge housing of claim 1, wherein the auxiliary memory unit receptacle is formed, at least in part, integrally with the first shell member.

4. The tape cartridge housing of claim 3, wherein the access slot is defined by the second shell member.

5. The tape cartridge housing of claim 1, wherein the auxiliary memory unit receptacle includes:
   a plurality of keys adapted to lock the auxiliary memory unit into the auxiliary memory unit receptacle, wherein the plurality of keys protrude at least partially into the access slot from the housing.

6. The tape cartridge housing of claim 5, wherein the plurality of keys is integrally formed in the first shell member, and wherein the plurality of keys protrude at least partially into the access slot from the first shell member.

7. The tape cartridge housing of claim 5, wherein the plurality of keys is integrally formed in the second shell member, and wherein the plurality of keys protrude at least partially into the access slot from the second shell member.

8. The tape cartridge housing of claim 1, further comprising a supply reel rotatably coupled within the first and second shell members.

9. The tape cartridge housing of claim 1, the plurality of chamfers including at least a first chamfer and a second chamfer, the first chamfer having a first surface, the second chamfer having a second surface, wherein the first surface and the second surface are oriented in a non-parallel relationship.

10. The tape cartridge housing of claim 1, wherein the distance between the chamfers decreases along the length of the chamfers in the direction toward the auxiliary memory unit receptacle.

11. A method of manufacturing a tape cartridge housing comprising:

providing a first shell member having a receptacle adapted to hold an auxiliary memory unit, the first shell member further having a plurality of chamfers for guiding the auxiliary memory unit during insertion;

providing a second shell member, wherein the first and second shell members define an access opening adapted for insertion of the auxiliary memory unit;

inserting the auxiliary memory unit into the receptacle before the first shell member and the second shell members are connected to form the tape cartridge housing; and;

attaching the first shell member and the second shell member to form the tape cartridge housing.

12. The method of manufacturing the tape cartridge housing of claim 11, the method further comprising:

removing the auxiliary memory unit through the access opening without disassembling the first and second shell members from each other.

* * * * *